(12) United States Patent
Everhart

(10) Patent No.: US 7,769,719 B2
(45) Date of Patent: Aug. 3, 2010

(54) FILE SYSTEM DUMP/RESTORE BY NODE NUMBERING

(75) Inventor: Craig F. Everhart, Chapel Hill, NC (US)

(73) Assignee: International Business Machines Corporation, Armonk, NY (US)

(*) Notice: Subject to any disclaimer, the term of this patent is extended or adjusted under 35 U.S.C. 154(b) by 218 days.

(21) Appl. No.: 11/325,750

(22) Filed: Jan. 5, 2006

(65) Prior Publication Data

US 2007/0156791 A1   Jul. 5, 2007

(51) Int. Cl.
*G06F 7/00*   (2006.01)

(52) U.S. Cl. .................. 707/651; 707/796; 711/162

(58) Field of Classification Search .............. None
See application file for complete search history.

(56) References Cited

U.S. PATENT DOCUMENTS

| | | | |
|---|---|---|---|
| 5,475,668 A * | 12/1995 | Azumatani et al. | 369/47.14 |
| 5,481,722 A | 1/1996 | Skinner | |
| 5,765,173 A * | 6/1998 | Cane et al. | 707/204 |
| 5,812,773 A * | 9/1998 | Norin | 709/204 |
| 6,366,987 B1* | 4/2002 | Tzelnic et al. | 711/162 |
| 6,412,017 B1* | 6/2002 | Straube et al. | 719/313 |
| 6,415,300 B1* | 7/2002 | Liu | 707/204 |
| 6,496,944 B1* | 12/2002 | Hsiao et al. | 714/15 |
| 6,708,205 B2 | 3/2004 | Sheldon et al. | |
| 6,889,247 B2 | 5/2005 | Christie et al. | |
| 7,054,960 B1* | 5/2006 | Bezbaruah et al. | 710/33 |
| 7,143,251 B1* | 11/2006 | Patterson | 711/162 |
| 7,284,104 B1* | 10/2007 | Wu et al. | 711/162 |
| 2002/0059317 A1 | 5/2002 | Black et al. | |
| 2003/0009438 A1 | 1/2003 | Achiwa et al. | |
| 2003/0182313 A1 | 9/2003 | Federwisch et al. | |
| 2003/0182325 A1* | 9/2003 | Manley et al. | 707/204 |
| 2004/0002999 A1* | 1/2004 | Rand | 707/104.1 |
| 2004/0230624 A1* | 11/2004 | Frolund et al. | 707/204 |
| 2004/0267838 A1* | 12/2004 | Curran et al. | 707/204 |
| 2005/0027748 A1 | 2/2005 | Kisley | |
| 2005/0027956 A1* | 2/2005 | Tormasov et al. | 711/162 |
| 2006/0075294 A1* | 4/2006 | Ma et al. | 714/13 |

* cited by examiner

*Primary Examiner*—Neveen Abel Jalil
*Assistant Examiner*—Vei-Chung Liang
(74) *Attorney, Agent, or Firm*—Lieberman & Brandsdorfer, LLC

(57) ABSTRACT

A method and system for replicating a file system organized as a data structure from a source server to a target server. The replication process preserves the order of the inode table entries from the source file system to in the target file system at all stages of the replication process, as well as the internal consistency of the replica of the data structure on the target server. This replication eliminates use and employment of a map as the order of the inode index is preserved during the replication process.

6 Claims, 13 Drawing Sheets

| Index | Name in the Structure |
|---|---|
| 1 | (root directory) / |
| 2 | /Readme |
| 3 | /bin |
| 4 | /bin/edit |

| 1 | ;;(6,"bin"),(7,"README") |
|---|---|
| 4 | ;; |
| 6 | ;;(4,"edit") |
| 7 | ;; |

FIG. 7  350

| 1 | ;;(6,"bin"),(7,"README") |
|---|---|
| 4 | 6;"edit"; |
| 6 | 1;"bin";(4,"edit") |
| 7 | 1;"README"; |

FIG. 9  450

| 1 | ;;(6,"bin"),(7,"README") |
|---|---|
| 6 | 1;"bin";(4,"edit"); |
| 4 | 6;"edit"; |
| 7 | 1;"README"; |

FIG. 11  550

FILE SYSTEM DUMP/RESTORE BY NODE NUMBERING

FIELD OF THE INVENTION

This invention relates to replication of file systems. More specifically, the invention relates to a method and tool for preserving table entries while replicating data from a source file system to a target file system.

BACKGROUND OF THE INVENTION

A file is a named collection of related information that appears to the user as a single contiguous block of data retained in storage media. Data blocks are structures used to store the actual data for the file. A file system is a structuring of data and metadata on storage media, which permits reading/writing of data on those media. In one embodiment, the file system is a hierarchy of directories, i.e. a directory tree, that is used to organize files on a computer. An inode is a data structure on a file system used to store information about a file, such as metadata. The information contained in an inode may include ownership of the file, access permission for the file, size of the file, file type and references to locations on disk of the data blocks for the file. Inodes are often stored in a contiguous table on disk media, and the inode number of a file is an integer that is the index of its inode in this table. When a file is created, it is assigned both a name and an inode number. The file has an inode number by virtue of being rooted in an inode, and it has a name by virtue of having an entry created for it in some directory. The data in a directory is minimally a list of pairs of file names along with their corresponding inode numbers, noting that directories will themselves have entries in a parent directory—that is, most directories are subdirectories of some other directory. Only the root directory of a file system has no explicit parent directory in the file system. Whenever a user or a program refers to a file by name, the system uses that name to search directories in the file system. The search begins with the root and successively reads and searches subdirectories, until the file's complete name has been used and the search finds the inode for the file, which enables the system to obtain the information it needs about the file, i.e. metadata, to perform further operations.

File systems may be exported across a network from a source location to a target location by passing out an encapsulated reference to an inode table index to file system clients. As used herein, the term "source" can be broadly defined as a location from which the subject data of this invention travels, and the term "target" can be defined as the location to which the data travels. FIG. 1 is a block diagram (10) of a storage system environment that includes a pair of interconnected file servers, including a source file server (20) and a target file server (40). The source and target file servers (20) and (40), respectively, are linked via a network (30) that can comprise a local or wide area network. An appropriate network adapter (32), (52) residing in communication with each file server (20) and (40) in communication with the network (30) through a network connections (22), (42), respectively, facilitates communication over the network (30). The source and target file servers (20) and (40) each respectively include a processor (26), (46), memory (28), (48), and a network adapter (32), (52). Each file server (20), (40) also includes a storage operating system (not shown) that implements a file system to logically organize information as a hierarchical structure of directories and files on storage media.

There are several known methods for replicating file systems across a network. One prior art method for replicating a file system duplicates the source file system's directory tree. An application at the source file system traverses the directory tree presented and copies each file and directory to the destination file system. FIG. 2 is a prior art block diagram (100) showing a sample inode table of a source file system. As shown, there are three entries in addition to the root directory (102), each of the entries are at indexes four (104), six (106), and seven (108) in the inode table. In this example, index one (102) is the root directory, index four (104) has an entry for an executable image for an edit program, index six (106) is a subdirectory, and index seven (108) has a readable text file. As shown, there are no entries at indexes two (110), three (112), and five (114). The reason for the empty indices may vary. For example, an index may be empty because the files that once resided in the index may have been deleted.

FIG. 3 is a block diagram (150) showing a sample inode table at a target file system as interpreted from the sample source inode table in FIG. 2 using the prior art inode table replication process described above. As shown, the order of the node table indices from the source file system are not preserved during the duplication process, and the empty indices have not been preserved. The order of the node table indexes are not specific and may be presented in alphabetical order, numerical order, etc. Accordingly, even though a given file at the target file system may be a copy of the same file at the source file system, their network file references are not interchangeable.

Another prior art method for replicating a file system copies the file system by duplicating each file and directory in the inode table in numerical order. For example, the file corresponding to the first node is copied from the source file system to the target file system. This is followed by the file corresponding to the second node, and each of the files corresponding to each successive node in the source file system's node table. However, one drawback associated with this method is that the intermediate state of the target file system will be inconsistent with itself because files are copied in an arbitrary order relative to their being referenced by a parent directory. For example, an inconsistent state is created when a directory entry that serves as a reference to a file is copied to the target file system before the file itself is copied, leaving a directory entry for a file not yet present. Conversely, another inconsistent state might be created when a file is copied from the source file system to the target file system before the directory entry for that file is copied from the source file system to the target file system. This intermediate state produces files that exist and consume space, but which are not pointed to by any directory entry, i.e., having no name. Both of these intermediate states are moot when the copy is completed without interruption, since files in the source and target file systems will have the same inode numbers, all files will have directory entries, and all directory entries will correspond to files, as in the source file system. However, there is a significant drawback associated with the two identified intermediate states and this occurs when there is an interruption in the replication process after a first entry is made in the target file system. An interruption in the prior art replication processes results in a partial target file system that is self-inconsistent and is not salvageable.

Therefore, there is a need for a method for replicating a file system that preserves the order of the inode table entries at all stages of the replication process, including all intermediate stages. The solution should ensure that if an interruption should occur during the replication process, the target file system remnants are salvageable.

SUMMARY OF THE INVENTION

This invention comprises a method and system for replicating a file system across a network and preserving the order of associated tables within the file system during the entire replication process.

In one aspect of the invention, a method is provided for replicating a file system. A source file system organized as a data structure is scanned in tree order. Each directory and directory index of the source file system is identified. Similarly, directories and directory indices from the source file system are created in the target file system. Following creation of the indices and directories in the target file system, contents from a directory in the source file system are copied to a corresponding directory in the target file system with the same identifying index as it held in the source file system. The process of copying directory contents is executed in a recursive manner.

In another aspect of the invention, a computer system is provided with a processor and memory, wherein the processor is coupled to the memory and the processor is operable to perform operations. Such processor operations include: scanning a file system organized as a data structure in tree order; identifying directories and directory indices in the scanned file system; creating directories from the scanned file system in a different file system, including directory indices; and recursively copying contents from a directory in the scanned file system to a corresponding remote directory in the different file system. The created directories are in the different file system are remote from said scanned directories.

In yet another aspect of the invention, a program storage device readable by a computer is provided. The computer tangibly embodies instructions executable by the computer to perform operations for replicating a file system. The operations include scanning a source file system, organized as a data structure, in tree order. Directories and directory indices in the source file system are identified, and directories and directory indices from the source file system are created in the target file system. Contents from a directory in the source file system are recursively copied to a corresponding directory in the target file system. The directory indices in the target file system are the same as the directory indices in the source file system.

In a further aspect of the invention a program storage device readable by a computer is provided. The computer tangibly embodies instructions executable by the computer to perform operations for replicating a file system. The instructions include scanning a source file system organized as a data structure in node order. During the scan, contents of each directory that are found are remembered and reported to a target file system so that a numeric identifier for a directory precedes an identifier for each object in the directory.

Other features and advantages of this invention will become apparent from the following detailed description of the presently preferred embodiment of the invention, taken in conjunction with the accompanying drawings.

BRIEF DESCRIPTION OF THE DRAWINGS

FIG. 3 is a block diagram of a prior art inode table at a target file system as replicated form the source file system in FIG. 2.

FIG. 4b is suggested for printing on the first page of the issued patent.

FIG. 7 is a block diagram of a temporary inode table at a first stage in the replication process.

FIG. 9 is a block diagram of a temporary inode table at a second stage in the replication process.

FIG. 11 is a block diagram of a temporary inode table at a third stage in the replication process.

DETAILED DESCRIPTION OF THE PREFERRED EMBODIMENTS

Two servers are interconnected across a network. The first server is in communication with one file system, and the second server is in communication with a second file system. Each of the file systems is organized into a data structure in a hierarchical manner. The file systems may be replicated and from one server to the other server across the network in a manner that preserves ordering of tables within the data structure.

The following description of the present invention is presented by using flow charts to describe either the structure or processing of presently preferred embodiments to implement the systems and methods of the present invention. Using the diagrams in this manner to present the invention should not be construed as limiting of its scope.

Figure 4A:
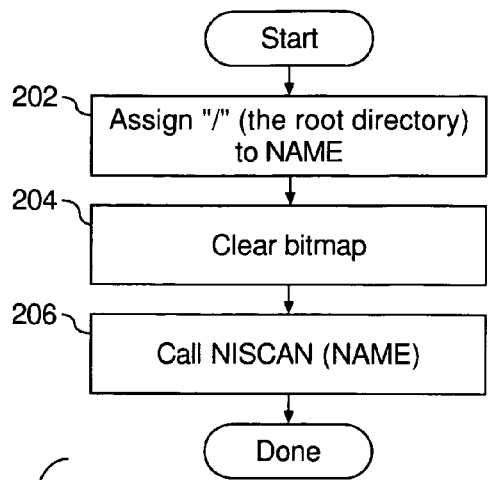
FIGS. 4a and 4b are flow charts illustrating a first part of a first method for replicating a file system across a network according to the preferred embodiment of this invention.
Figure 4B:
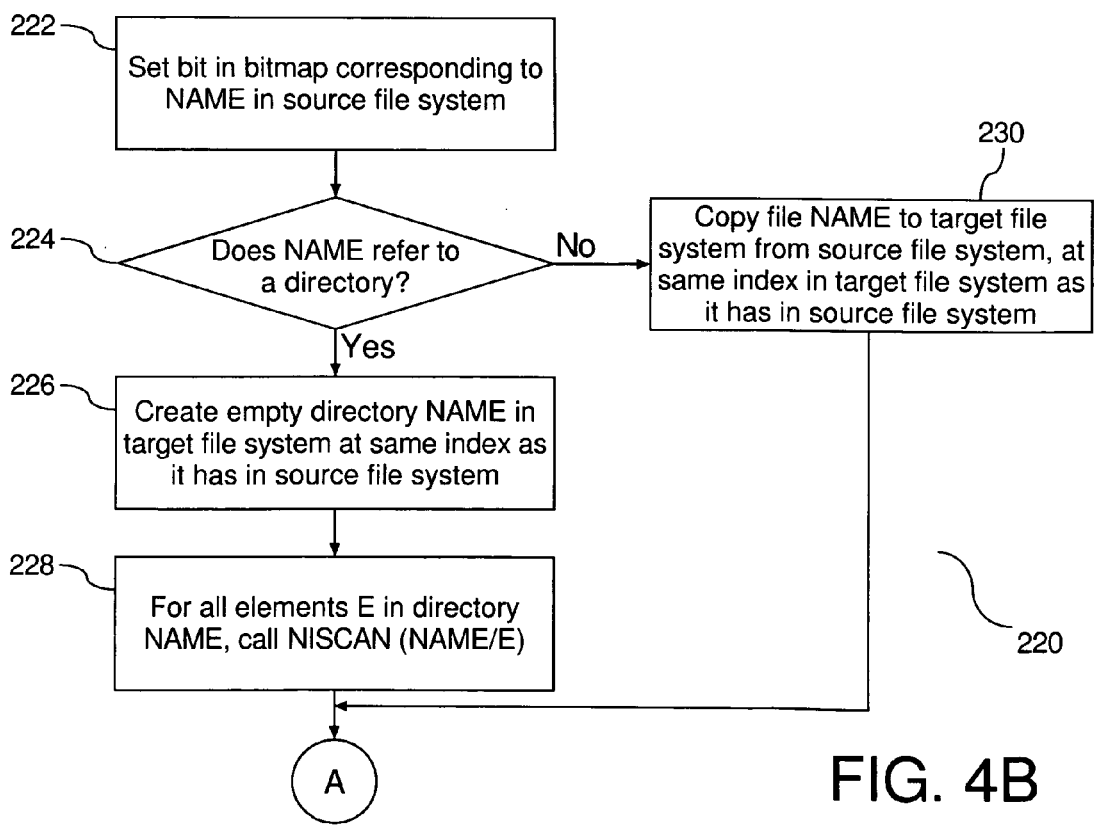

There are two methods disclosed herein for replicating a file system across a network. There are two parts to this method, with the first part having two segments. FIG. 4a is a flow chart (200) illustrating a first segment of the first part of a first replication method that scans the source file system organized in tree order reporting directories in the tree before reporting the objects pointed to by the directories. The root directory is assigned to the a variable, NAME, (202), and a bitmap used for the replication process is cleared (204). A function for copying the name index, NISCAN, is called (206). This function has one parameter, NAME. FIG. 4b is a flow chart (220) illustrating a second segment of the first part of the first replication method. In this segment, the NISCAN function is illustrated in detail. The bit for use in the bitmap is set to the variable NAME in the source file system (222). Thereafter, a first test determines if the NAME argument to the copy function is a directory in the source file system (224). A positive response to the test at step (224) results in creation of an empty directory, NAME, in the target file system at the same index as it has in the source file system (226). The function for copying the directory, NISCAN, is recursively called (228) to copy all elements, E, in the directory NAME, i.e. NISCAN (NAME/E). Each invocation of NISCAN sets the bit for one file, including the subfiles of each directory. The setting of the bit in the bitmap serves as an indicator that a particular inode—that is, a particular file and/or directory has been replicated in the target file system. If the response to the test at step (224) is negative, the file, i.e. NAME, is copied to the target file system from the source file system at the same index in the target file system as it has in the source file system (230). When all of the contents of the directory from the source file system have been copied to the target file system, the name index copy function is complete. If an interrupt should occur before the replication is complete, the consistency of the replicated target file system directories remain intact because every file and directory in the replicated portions has been created with a name.

Figure 5:
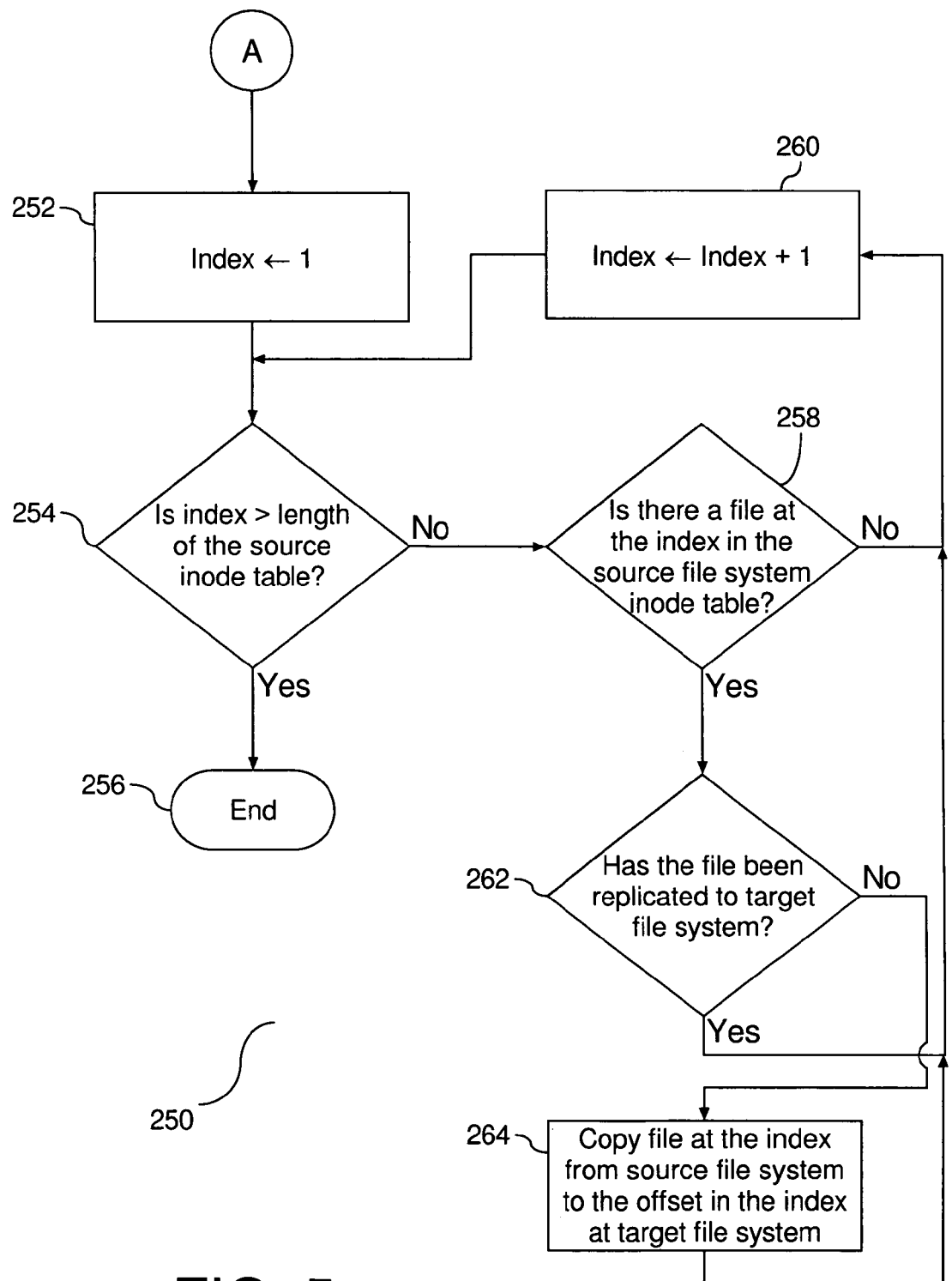
FIG. 5 is a flow chart illustrating a second part of the first method for replicating a file system across a network.

Following replication of the directory and its entries in the target file system, a second function is invoked to report any objects in the source file system that do not have a directory entry. FIG. 5 is a flow chart (250) illustrating this second function. An index variable is set to one (252). Thereafter, a test is conducted to determine if the index variable is bigger than the source inode table (254). If the response to the test at step (254) is positive, the copy process for the source inode table is complete (256) as this is an indication that the index is larger than the source inode table and all inodes in the source file system have been scanned. However, if the response to the test at step (254) is negative, a test is conducted to determine if there is a file at the index in the source file system inode table (258). A positive response to the test at step (258) is an indication that a file in the index may need to be replicated in the target file system. However, a negative response to the test at step (258) results in an increment of the index variable (260). Thereafter, the process returns to step (254). A positive response to the test at step (258) results in a subsequent test to determine if the file at the set index in the inode table has been replicated in the target file system (262). In one embodiment, a bit would be set in a bitmap, which bitmap has been a temporary structure all along, in the source file system corresponding to this file if it has been replicated. A positive response to the test at step (262) returns to step (260) where the index variable is incremented. Similarly, a negative response to the test at step (224) results in replication of the file at the index in the inode table from the source file system to the target file system at that index (264), followed by a return to step (260) for increment of the index variable. The sweep process continues until a positive response is returned from the test at step (254) indicating that the end of the table has been reached. Accordingly, as shown herein, an object is replicated from the source file system to the target file system with the same node indexes as in the source file system.

Figure 6:
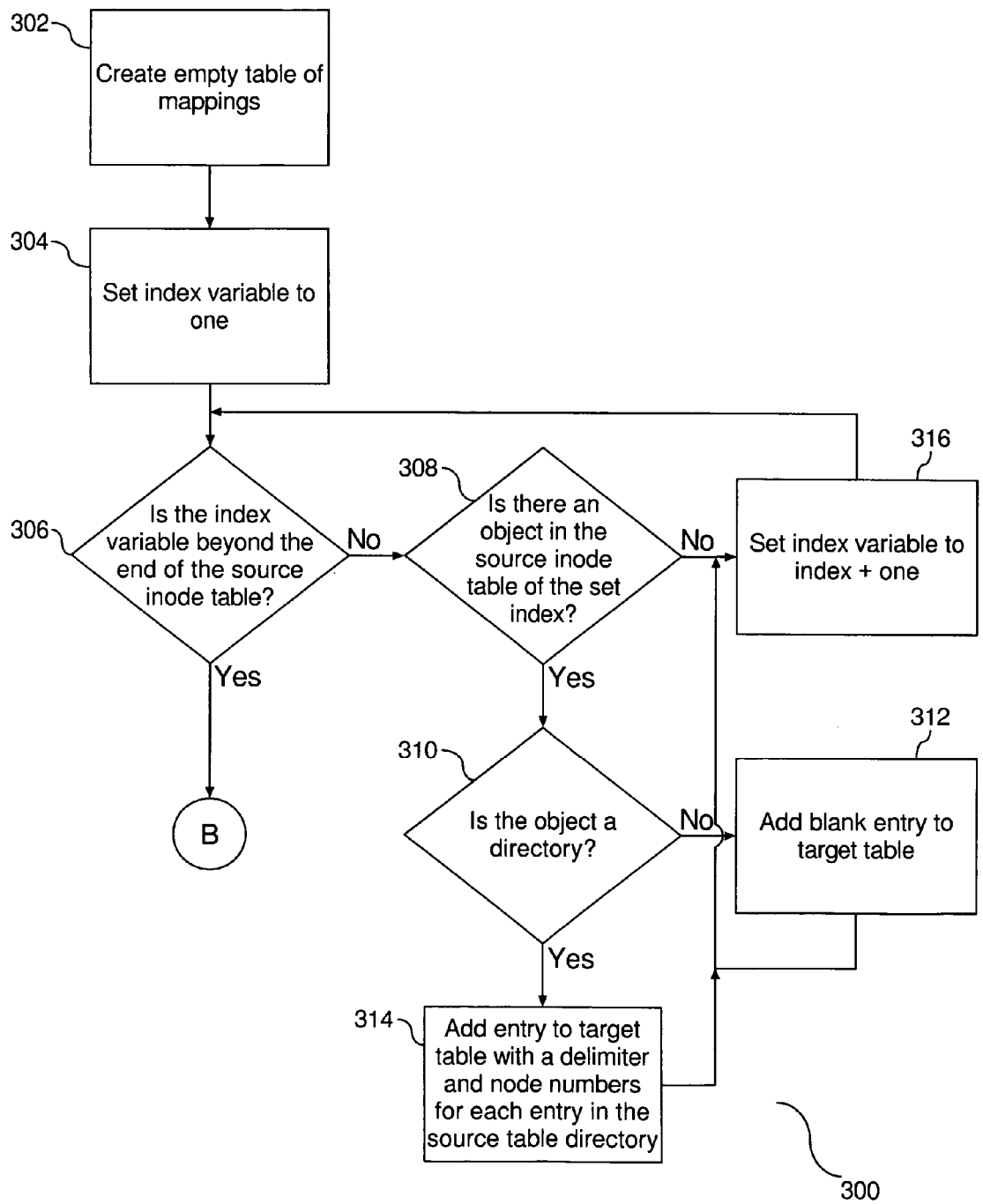
FIG. 6 is a flow chart illustrating a first part of a second method for replicating a file system across a network.

The process illustrated above in FIGS. 4 and 5 is a recursive method for replicating a file system by scanning the source files system in tree order while preserving the elements being copied. In another embodiment, tables form the source file system may be replicated to the target file system while preserving the inode indices of the elements being copied without invoking a recursive function. There are three primary routines involved in this replication process. FIG. 6 is a flow chart (300) illustrating a first routine in a single pass non-recursive method for replicating a file system in node order. Prior to initiating the first routine, an empty table of mappings is created in the target file system (302). This empty table is a temporary structure. Following step (302), an index variable is set to one (304). Thereafter, a test is conducted to determine if the index variable is beyond the end of the source table being scanned (306). In one embodiment, the table being replicated in the target file system is a source file system inode table. If the response to the test at step (306) is positive, the first routine has completed and the second routine is initiated at step (402). However, if the response to the test at step (306) is negative, a test is conducted to determine if there is an object at the set index in the source table being replicated (308). A positive response to the test at step (308) will follow with a subsequent test to determine if the object in the source file system is a directory (310). A negative response to the test at step (310) will result in adding an entry to the target table that is blank, thereby creating a table entry for space to be used at a later point in time (312). Similarly, a positive response to the test at step (310) will result in adding an entry to the temporary target table with delimiters and node numbers for each entry in the directory of the source file system table directory (314). Following completion of either step (312) or (314), or following a negative response to the test at step (308), the index variable is incremented (316), followed by a return to step (306). The routine illustrated in steps (306) through (316) illustrates a process for scanning a source file system table and for creating a temporary replicated table.

Figure 1:
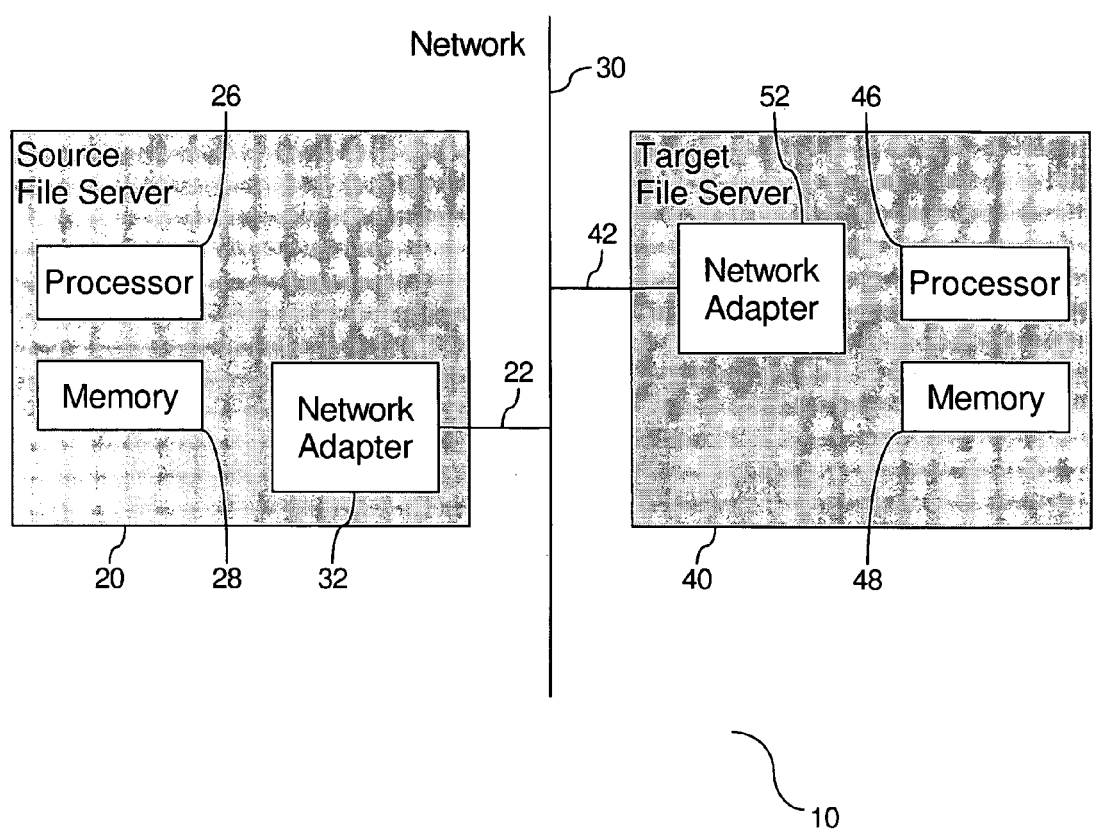
FIG. 1 is a block diagram of a prior art computer system.
Figure 2:
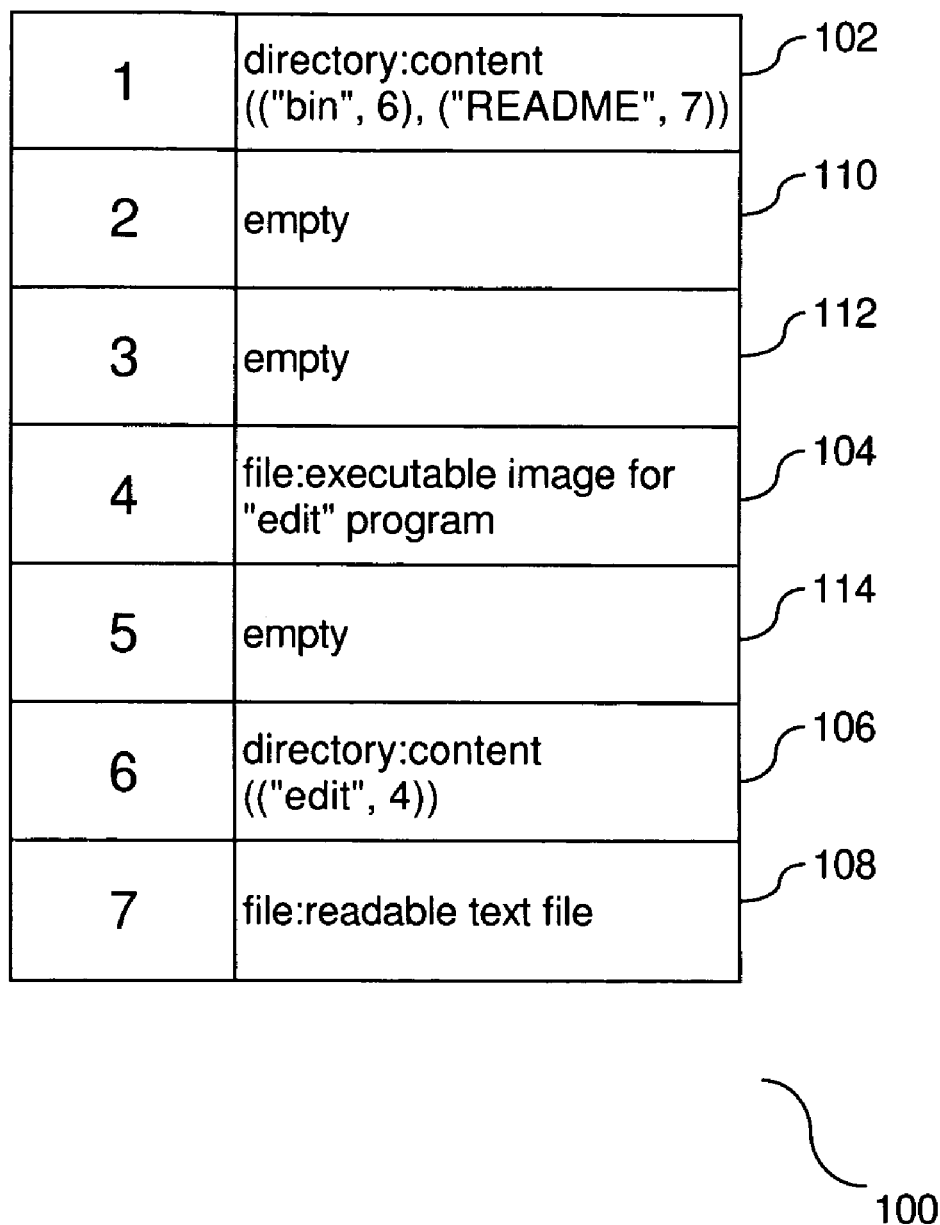
FIG. 2 is a block diagram of a prior art inode table from a source file system.

FIG. 7 is a block diagram (350) showing a temporary table in the target file system based on the sample inode table of a source file system shown in FIG. 2 As shown, there are four entries. Each of the entries represent indices one, four, six, and seven in the source inode table, and each entry has two delimiters each represented by the ";" character. As shown, there are no entries at representing indices two, three, and five, as these are empty indices.

Each entry of the temporary table contains several fields with optional values: an optional integer X before the first delimiter; an optional string Y between the two delimiters; and an optional pairlist following the second delimiter. A pairlist is a sequence of pairs, each of an integer called tix followed by a name.

Figure 8:
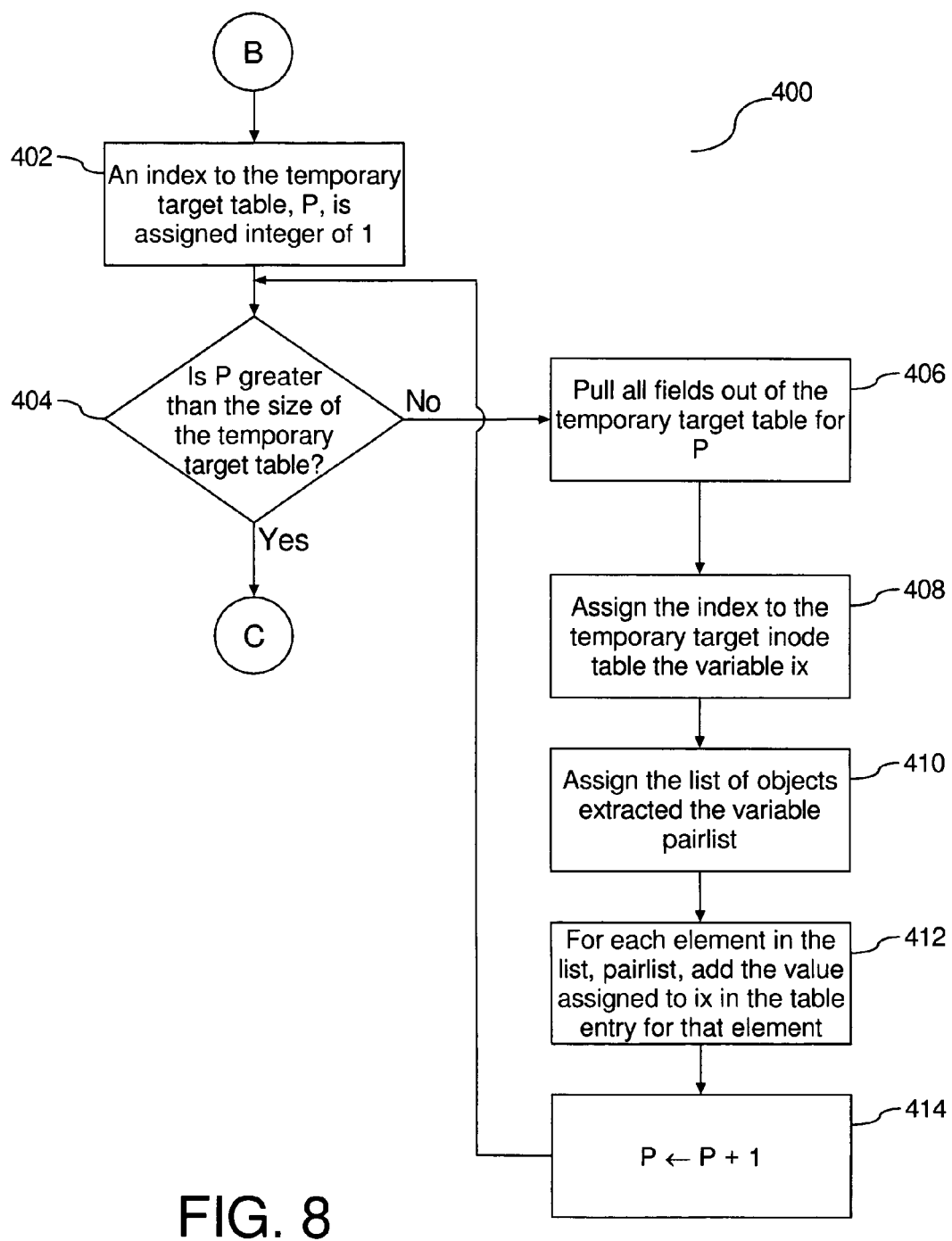
FIG. 8 is a flow chart illustrating a second part of a second method for replicating a file system across a network.

Following completion of the process of scanning and replicating the source file system table, the second routine is initiated to sort the temporary table created in FIG. 6. In one embodiment, the sort routine includes two separate algorithms. FIG. 8 is a flow chart (400) illustrating the first algorithm for sorting the temporary table created in FIG. 6. At an initial step an index to the temporary table, P, is assigned the integer of one (402). Thereafter, a test is conducted to determine if the index to the temporary table is larger than the size of the temporary target table (404). A positive response to the test at step (404) will result in completion of the first algorithm of the temporary table, and will proceed with initiation of the second algorithm in FIG. 10. However, a negative response to the test at step (404) will result in pulling the fields out of the temporary table entry for the variable P (406), assigning the index to the temporary table with the variable ix (408), and assigning the list of objects extracted from the field pairlist (410) e.g. (ix→;; pairlist). For each element in the list pairlist, the value assigned to ix in the table entry for that element ix is added in the temporary table entry for the temporary table field of that element, tix (412). That is, the tix field value is used to choose an entry to update, and the ix value is inserted in the X field of the entry. Similarly, the name that had been paired with that tix value in the pairlist is inserted in the Y field of the entry being modified. Following step (412), the variable P, i.e. the index to the temporary table, is incremented (414), and the routine returns to step (404). Accordingly, the first sorting routine shown in steps (402)-(414) continues until a positive response is received for the test at step (404).

FIG. 9 is a block diagram (450) showing a temporary table at a second stage in the replication process based on the temporary table shown in FIG. 7 and following completion of the first algorithm for sorting the temporary table created in FIG. 6. As shown, there are four entries. Each of the entries represent indices one, four, six, and seven in the source inode table, and entries associated with indices four, six, and seven have been modified in accordance with completion of the algorithm illustrated in FIG. 8.

Figure 10:
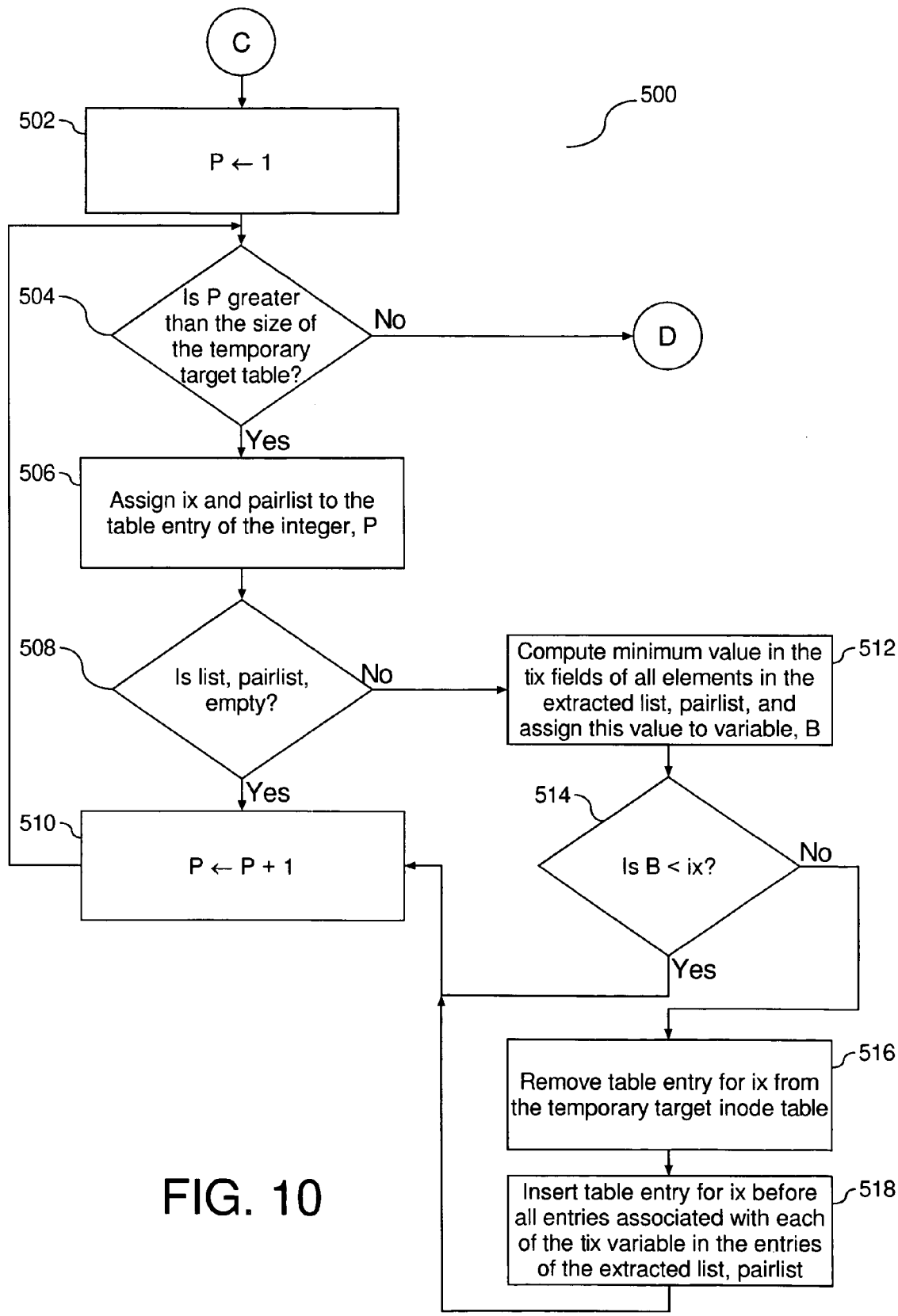
FIG. 10 is flow chart illustrating a third part of a second method for replicating a file system across a network.

FIG. 10 is a flow chart illustrating the second algorithm for sorting the temporary table (500) that is initiated following the positive response to the test at step (404) in FIG. 8. The variable P, representing the index to the temporary table, is assigned the integer one (502). Thereafter, a test is conducted to determine if P is larger than the size of the temporary table (504). A positive response to the test at step (504) will result in completion of the second algorithm for sorting the temporary table. However, a negative response to the test at step (504) will result in updating the temporary table line by line by assigning ix and pairlist to the table entry of the variable P (506). Following the assignment at step (506), a test is conducted to determine if the assigned list, pairlist, from step (506) is empty (508). A positive response to the test at step (508) will result in an increment of the variable P at step (510), and a return to step (504). However, a negative response to the test at step (508) will result in computing the minimum value in the temporary table index fields (tix) of all elements in the extracted list, pairlist, and assigning this minimum value to the variable B (512). Thereafter, a test is conducted to determine if the variable B is less than the index to the temporary target table, ix (514). A positive response to the test at step (514) will result in an increment of the variable P (510), and a return to step (504). Similarly, a negative response to the test at step (514) follows with removal of the table entry for ix from the temporary table (516) and inserting the table entry for ix before all entries that are associated with each of the tix variables in the entries of the extracted list, pairlist (518). The removal and insertion at steps (516) and (518), respectively, supports changing the ordering in the temporary table, i.e. an update of the data structure. Following the insertion at step (518), the process returns to step (510) for the increment of the variable P. Accordingly, the second algorithm for sorting the temporary table performs a re-ordering of the temporary table.

FIG. 11 is a block diagram (550) showing a temporary table based on the sample temporary table of a source file system shown in FIG. 9 and following reordering of the table based upon completion of the second algorithm for sorting the temporary table created in FIG. 6. As shown, there are four entries. Each of the entries represent indices one, four, six, and seven in the source inode table. As shown, the ordering of the indices in the temporary table have been modified in accordance with completion of the execution of the algorithm illustrated in FIG. 10.

Figure 12A:
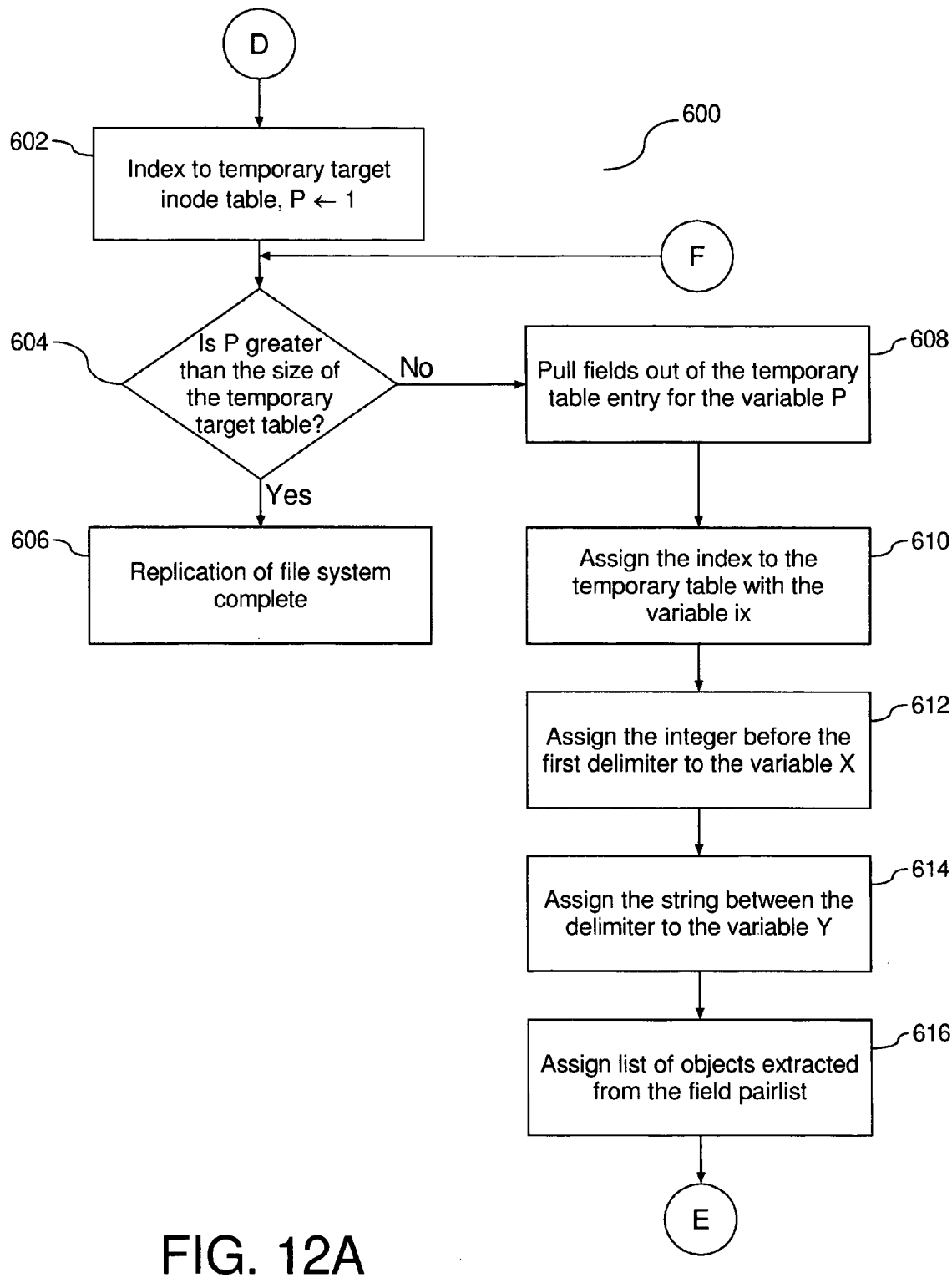
FIGS. 12a and 12b are flow charts illustrating a fourth part of a second method for replicating a file system across a network.
Figure 12B:
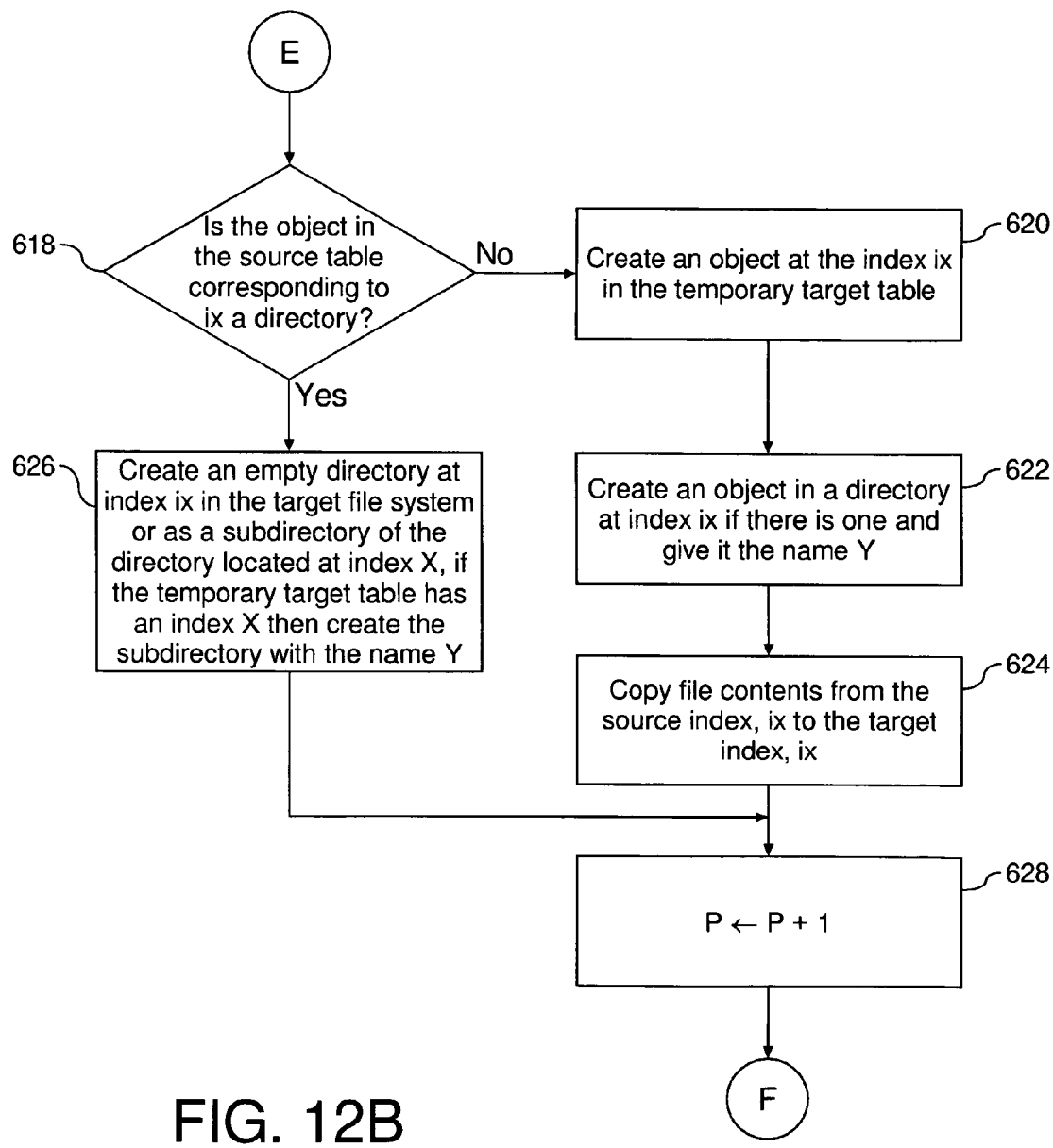

Following completion of the second sort routine as shown in FIG. 10, the final routine is initiated for replicating the table from the source file system. FIGS. 12a and 12b are a flow chart (600) illustrating the final routine for replicating the table from the source file system to the target file system. The index to the temporary table, P, is assigned the integer one (602). Thereafter, a test is conducted to determine if the index to the temporary table, P, is greater than the size of the temporary table reorganized in the second sort algorithm shown in FIG. 10 (604). A positive response to the test at step (604) will result in completion of replication of the file system (606). However, a negative response to the test at step (604) will result in pulling the fields out of the temporary table entry for the variable P (608), assigning the index to the temporary table with the variable ix (610), assigning the integer before the first delimiter to the variable X (612), assigning the string between the delimiters to the variable Y (614), and assigning the list of objects extracted from the field pairlist (616), e.g. (ix→X;Y; pairlist). Following the assignment at step (616), a test is conducted to determine if the object in the source index corresponding to the variable ix is a directory (618). A negative response to the test at step (618), will result in creating an object at the index ix in the temporary table (620), creating an object in a directory at index ix, if there is one, and giving it the name Y (622), and copying the file contents from the source index ix to the target index ix (624). Similarly, a positive response to the test at step (618) results in creating an empty directory at the index ix in the target file system or as a subdirectory of the directory located at index X, if the temporary target table has an index X then create the subdirectory with the name Y (626). If the temporary table has an entry for the variable X, then an empty directory is created as a subdirectory of the directory at the index X with the name Y. Following completion of steps (624) and (626), the variable P is incremented (628), and the process returns to step (604). Accordingly, the completion of the copy routine provides a duplication of the source table in the target file system.

Figure 13:
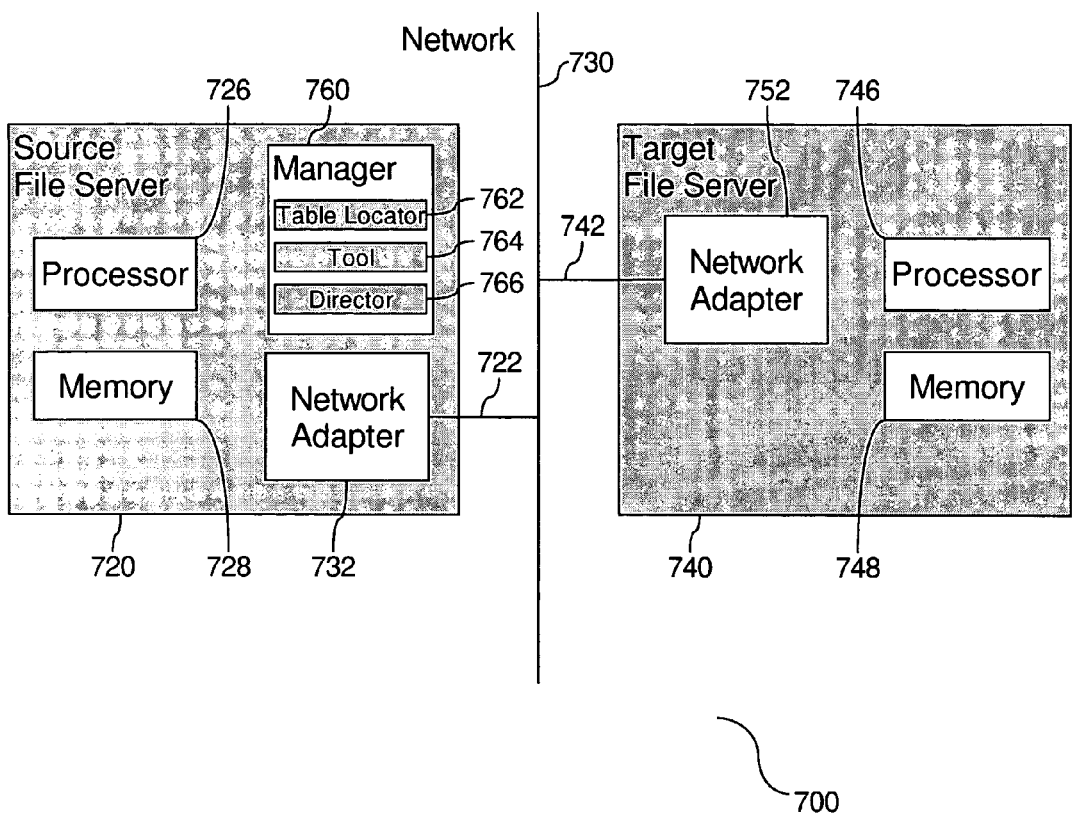
FIG. 13 is a block diagram of a computer system illustrating placement of the manager according to one embodiment of the invention.

The present invention contemplates both methods and systems for replication of hieratically structured data. The invention can take the form of an entirely hardware embodiment, an entirely software embodiment or an embodiment containing both hardware and software elements. FIG. 13 is a block diagram (700) illustrating the manager in a hardware environment that is configured to invoke a recursive process for copying all contents from a directory in the source file system to a corresponding directory in the target file system. As shown, a source file server (720) includes a processor (726), memory (728), and a network adapter (732). Similarly, the target file server (740) includes a processor (746), memory (748), and a network adapter (752). The source and target file servers (720) and (740), respectively, are linked via a network (730) through network connections (722) and (742) that can comprise a local or wide area network. The source file server also includes a manager (760), which includes a table locator (762), a tool to create each directory of the located table of the source file system in the target file system (764), and a director (766) to recursively copy contents in a directory of a source table to a corresponding directory in the target file system. In one embodiment, the manager (760) with its table locator (762), tool (764), and director (766) may be embedded within the target file server (740), or in an alternate processing unit with a processor, memory, and a network adapter.

In a preferred embodiment, the invention is implemented in software, which includes but is not limited to firmware, resident software, microcode, etc. With respect to software elements, both the source file system and the target file system may each have a manager that resides within memory of a file system server in the respective file system. The source file system manager may include instructions and/or program code for invoking the algorithms outlined and discussed above. Similarly, in a hardware environment, the source and target file system managers may reside external to the memory of the file system servers in the respective file system.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

Embodiments within the scope of the present invention also include articles of manufacture comprising program storage means having encoded therein program code. Such program storage means can be any available media which can be accessed by a general purpose or special purpose computer. By way of example, and not limitation, such program storage means can include RAM, ROM, EEPROM, CD-ROM, or other optical disk storage, magnetic disk storage or other magnetic storage devices, or any other medium which can be used to store the desired program code means and which can be accessed by a general purpose or special purpose computer. Combinations of the above should also be included in the scope of the program storage means.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, random access memory (RAM), read-only memory (ROM), a rigid magnetic disk, and an optical disk. Current examples of optical disks include compact disk B read only (CD-ROM), compact disk B read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, wireless and Ethernet adapters are just a few of the currently available types of network adapters.

Alternative Embodiments

It will be appreciated that, although specific embodiments of the invention have been described herein for purposes of illustration, various modifications may be made A without departing from the spirit and scope of the invention. In particular, the invention should not be limited to replication of an inode table from a source file system to a target file system. Rather, the algorithms shown herein may be expanded to include replication of any data structure and associated tables. Accordingly, the scope of protection of this invention is limited only by the following claims and their equivalents.

I claim:

1. A method for replicating a file system comprising:
    creating an empty temporary inode table at a target file system;
    scanning a source file system organized as a data structure in inode order, including for each object in a directory recording a pairlist with a second field associated with an object name and a first field associated with an object inode number in the source file system;
    identifying an inode number of each directory in the source file system and entering each directory inode number in the temporary table;
    creating a new entry order of directory entries in the temporary table, including sorting the temporary table entries according to the pairlist for each table entry, wherein a directory entry in the sorted temporary table precedes an entry for an object in said directory;
    creating directories in the target system according to the new order, each directory created at a same inode number as in the source file system; and
    copying all objects in a directory from the source file system to the target file system, wherein each object is copied at an inode number identified in the first field of a pairlist associated with said object, and wherein the directories are created before contents of the directories are copied.

2. The method of claim 1, further comprising preserving inode number of each object from said source to said target file system at all stages of replication of directory indices.

3. The method of claim 1, wherein remnants of said target system are salvageable.

4. A computer system comprising:
    a processor coupled to memory, the processor operable to perform operations comprising:
        creating an empty temporary inode table at a target file system;
        scanning a source file system organized as a data structure in inode order, including for each object in a directory recording a pairlist with a second field associated with an object name and a first field associated with an object inode number in the source file system;
        identifying an inode number of each directory in the source file system and entering each directory inode number in the temporary table;
        creating a new entry order of directory entries in the temporary table, including sorting the temporary table entries according to the pairlist for each table entry, wherein a directory entry in the sorted temporary table precedes an entry for an object in said directory;
        creating directories and files in the target system according to the new order, each directory created at a same inode number as in the source file system; and
    copying all objects in a directory from the source file system to the target file system, wherein each object is copied at an inode number identified in the first field of a pairlist associated with said object, and wherein the directories are created before contents of the directories are copied.

5. The system of claim 4, further comprising instructions to preserve inode number of each object from said source to said target file system at all stages of replication of directory indices.

6. The method of claim 4, wherein remnants of said target system are salvageable.

* * * * *